(12) United States Patent
Lyubomirsky et al.

(10) Patent No.: US 9,628,216 B2
(45) Date of Patent: Apr. 18, 2017

(54) DATA COMMUNICATION USING MULTIPLE CHANNELS

(71) Applicant: Finisar Corporation, Sunnyvale, CA (US)

(72) Inventors: Ilya Lyubomirsky, Pleasanton, CA (US); Christopher Kocot, San Carlos, CA (US); Jonathan Paul King, San Francisco, CA (US); Sascha Hallstein, Los Gatos, CA (US); Brendan Hamel-Bissell, Stanford, CA (US)

(73) Assignee: FINISAR CORPORATION, Sunnyvale, CA (US)

( * ) Notice: Subject to any disclaimer, the term of this patent is extended or adjusted under 35 U.S.C. 154(b) by 0 days.

(21) Appl. No.: 14/943,926

(22) Filed: Nov. 17, 2015

(65) Prior Publication Data
US 2016/0142150 A1    May 19, 2016

Related U.S. Application Data

(60) Provisional application No. 62/080,747, filed on Nov. 17, 2014.

(51) Int. Cl.
*H04J 14/02* (2006.01)

(52) U.S. Cl.
CPC ...... *H04J 14/0257* (2013.01); *H04J 14/0221* (2013.01)

(58) Field of Classification Search
CPC .................... H04J 14/0221; H04J 14/0257
USPC ....................................................... 398/182
See application file for complete search history.

(56) References Cited

U.S. PATENT DOCUMENTS

| | | | | |
|---|---|---|---|---|
| 2009/0003468 A1* | 1/2009 | Karabulut | ............. | H04L 5/0007 375/260 |
| 2011/0293031 A1* | 12/2011 | Zhang | .................. | H04L 5/0007 375/268 |
| 2012/0106975 A1* | 5/2012 | Olsson | ................. | H04B 10/516 398/147 |
| 2013/0272698 A1* | 10/2013 | Jin | ...................... | H04L 27/2628 398/43 |
| 2015/0086215 A1* | 3/2015 | Chen | .................. | H04B 10/2507 398/136 |
| 2016/0285548 A1* | 9/2016 | Nishihara | .............. | H04B 10/50 |

* cited by examiner

*Primary Examiner* — Dalzid Singh
(74) *Attorney, Agent, or Firm* — Maschoff Brennan (57) ABSTRACT

A method of transmitting data may include receiving feedback information that includes effective channel bandwidths, signal-to-noise ratios (SNRs) associated with multiple optical channels on an optical link, and individual SNRs associated with subcarriers on each optical channel. The method may include determining multiple subcarrier power allocation schemes based on the feedback information. Each subcarrier power allocation scheme may be associated with a corresponding optical channel from the multiple optical channels and may be configured to allocate a signal power among subcarriers configured to transmit on the corresponding optical channel. The method may include determining, based on the feedback information, an optical power allocation scheme configured to allocate an optical power among the multiple optical channels. The method may include transmitting data on the multiple optical channels based on the multiple subcarrier power allocation schemes and the optical power allocation scheme.

22 Claims, 7 Drawing Sheets

DATA COMMUNICATION USING MULTIPLE CHANNELS

CROSS-REFERENCE TO RELATED APPLICATION

This application claims the benefit of and priority to U.S. Provisional App. No. 62/080,747, filed Nov. 17, 2014, which is incorporated herein by reference.

FIELD

Some embodiments described herein generally relate to multi-channel data communication through one or more multi-mode fiber links.

BACKGROUND

Unless otherwise indicated herein, the materials described herein are not prior art to the claims in the present application and are not admitted to be prior art by inclusion in this section.

A multi-mode fiber (MMF) link may have a peak bandwidth in a particular wavelength range. For example, an effective bandwidth of an OM3 link may have a peak value in a wavelength range between 800 nanometers and 900 nanometers. However, due to manufacture errors and other factors, it may not be possible to predict which wavelength in the wavelength range that may have a peak bandwidth on the MMF link.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY OF SOME EXAMPLE EMBODIMENTS

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Some example embodiments described herein generally relate to multi-channel data communication through one or more optical links.

In an example embodiment, a method of transmitting data through an optical link is described. The method may include receiving feedback information that includes effective channel bandwidths, signal-to-noise ratios (SNRs) associated with multiple optical channels on the optical link, and individual SNRs associated with subcarriers on each optical channel. The method may additionally include determining multiple subcarrier power allocation schemes based on the feedback information. Each subcarrier power allocation scheme may be associated with a corresponding optical channel from the multiple optical channels and may be configured to allocate a signal power among subcarriers configured to transmit on the corresponding optical channel. The method may additionally include determining, based on the feedback information, an optical power allocation scheme configured to allocate an optical power among the multiple optical channels. The method may additionally include transmitting data on the multiple optical channels based on the multiple subcarrier power allocation schemes and the optical power allocation scheme.

In another example embodiment, a transmitter configured to transmit data through an optical link is described. The transmitter may include a bit-loading power-allocation module configured to: receive feedback information that includes effective channel bandwidths, signal-to-noise ratios (SNRs) associated with multiple optical channels on the optical link, and individual SNRs associated with subcarriers on each optical channel; determine multiple subcarrier power allocation schemes based on the feedback information, where each subcarrier power allocation scheme may be associated with a corresponding optical channel from the multiple optical channels and may be configured to allocate a signal power among subcarriers configured to transmit on the corresponding optical channel; and determine, based on the feedback information, an optical power allocation scheme configured to allocate an optical power among the multiple optical channels. The transmitter may additionally include a digital signal processor (DSP) module communicatively coupled to the bit-loading power-allocation module. The DSP module may be configured to generate multiple discrete multi-tone (DMT) signals. Each DMT signal may include a respective set of subcarriers, and a power of each DMT signal may be allocated among the respective set of subcarriers based on a corresponding subcarrier power allocation scheme from the multiple subcarrier power allocation schemes. The transmitter may additionally include digital-to-analog converters (DACs) communicatively coupled to the DSP module. The DACs may be configured to convert the multiple DMT signals to respective analog signals. The transmitter may additionally include a laser array communicatively coupled to the DACs and the bit-loading power-allocation module. The laser array may be configured to generate multiple optical carriers to transmit on the multiple optical channels according to the respective analog signals. Each optical carrier may carry information of a corresponding DMT signal from the multiple DMT signals. The laser array may be configured to allocate the optical power among the multiple optical carriers based on the optical power allocation scheme. The transmitter may additionally include a multiplexer communicatively coupled to the laser array. The multiplexer may be configured to multiplex the multiple optical carriers onto the optical link to transmit through the optical link.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF SOME EXAMPLE EMBODIMENTS

Embodiments described herein generally relate to multi-channel data communication through one or more optical links. A "channel" as used herein may refer to a transmission medium (e.g., optical fiber), a wavelength, a polarization, or other optical channel that generally tends to isolate one optical carrier from another.

Some embodiments described herein may allow selecting a wavelength from multiple wavelengths for data transmission. For example, since it may not be possible to predict which wavelength from a wavelength range that may have a peak bandwidth on an MMF link, a transmitter may select multiple wavelengths from the wavelength range and may use each wavelength to transmit a respective DMT signal to a receiver. The receiver may measure a respective signal-to-noise ratio (SNR) and/or a respective effective channel bandwidth associated with each wavelength. The receiver may transmit the respective SNR and effective channel bandwidth associated with each wavelength back to the transmitter. The transmitter may then select a wavelength with a highest SNR and/or a highest effective channel bandwidth from the multiple wavelengths to transmit data so that an increased reach and/or a higher bit rate of the MMF link may be achieved.

Alternatively, some embodiments described herein may allow simultaneously transmitting multiple DMT signals on multiple optical channels that associate with multiple wavelengths (or multiple different optical fibers) on an optical link such as a single-fiber (or parallel multi-fiber) MMF fiber link Due to variations of channel bandwidths across the wavelength range, each optical channel may have a different channel bandwidth and/or a different SNR. Subcarriers of a DMT signal configured to transmit on a particular optical channel may be loaded with different numbers of bits per unit of time (e.g., per symbol time) and allocated with different signal power levels using a water filling technique or another suitable technique. Additionally, since an optical power to be allocated to the optical channels may be limited, the optical power may be shared and distributed across the multiple optical channels based on SNRs and/or effective channel bandwidths of the optical channels using a water filling technique or another suitable technique. As a result, each optical channel may be allocated with a different bit rate and/or a different optical power level. The bit-loading and power-allocation process may be performed cooperatively across the multiple optical channels to increase an overall bit rate of the optical link.

Technologies described herein may be implemented in modules that may have a data rate of 100 Giga bits per second (Gb/s), 400 Gb/s, and/or another suitable data rate in MMF applications. The technologies may combine DMT modulations and a vertical-cavity surface-emitting laser (VCSEL) array into a wavelength-division multiplexing (WDM) transmitter to achieve an extended reach and/or an increased bit rate on an MMF link.

Technologies described herein may also be implemented in a parallel MMF fiber module. In a parallel MMF module, rather than using different wavelength channels to transmit data on a single MMF fiber, a common wavelength (e.g., 850 nanometers) may be used to transmit data on multiple parallel MMF fibers respectively. Thus, multiple optical channels may be established for transmitting data in parallel, and each optical channel may be associated with the common wavelength and established on a different MMF fiber. The common wavelength may have a value in a wavelength range (e.g., a wavelength range between 780 nanometers and 1000 nanometers).

Since each MMF fiber may have a different effective channel bandwidth and/or a different SNR at the common wavelength (e.g., 850 nanometers), similar subcarrier power allocation schemes and optical power allocation schemes may be implemented. For example, subcarriers of a DMT signal configured to transmit on a particular optical channel through a particular MMF fiber may be loaded with different numbers of bits per unit of time (e.g., per symbol time) and allocated with different signal power levels using a water filling technique or another suitable technique. Additionally, an optical power may be shared and distributed across the multiple optical channels associated with the multiple MMF fibers based on SNRs and/or effective channel bandwidths of the optical channels using a water filling technique or another suitable technique. As a result, each optical channel may be allocated with a different bit rate and/or a different optical power level.

Reference will now be made to the drawings to describe various aspects of some example embodiments of the invention. The drawings are diagrammatic and schematic representations of such example embodiments, and are not limiting of the present invention, nor are they necessarily drawn to scale.

Figure 1:
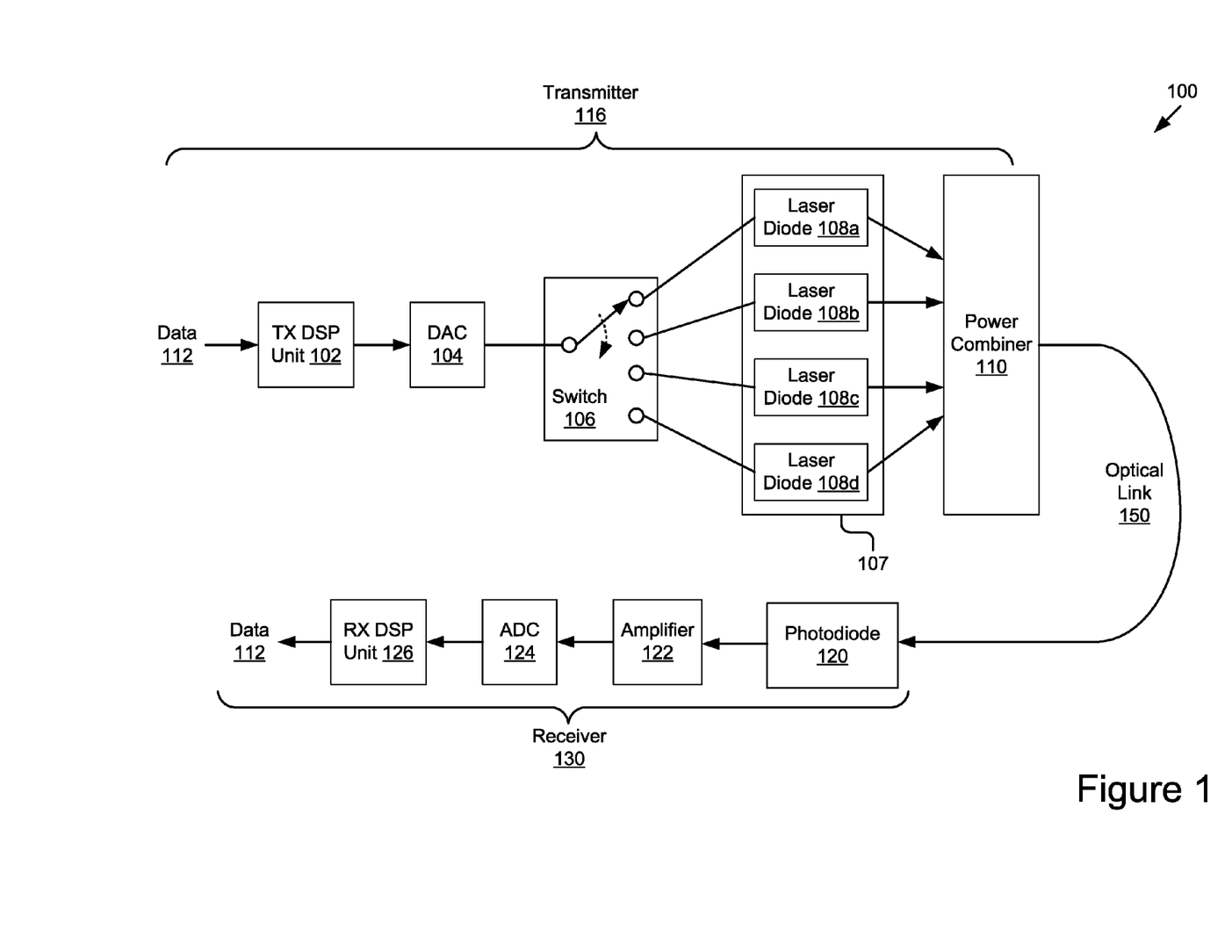
FIG. 1 is a block diagram of an example structure of a data communication system.

FIG. 1 is a block diagram of an example structure of a data communication system 100, arranged in accordance with at least some embodiments described herein. The example data communication system 100 illustrated in FIG. 1 includes a transmitter 116 and a receiver 130. The transmitter 116 may transmit data to the receiver 130 through an optical link 150. The optical link 150 may include an MMF fiber such as OM3 or any other suitable multi-mode fiber. In some embodiments, the data communication system 100 may include a first transceiver and a second transceiver that may communicate with each other through the optical link 150. The first transceiver may include the transmitter 116 and a receiver that may be similar to the receiver 130. The second transceiver may include the receiver 130 and a transmitter that may be similar to the transmitter 116. In these and other embodiments, data communication over the optical link 150 may be bi-directional.

The transmitter 116 may include a transmitter (TX) digital signal processor (DSP) unit 102, a digital-to-analog converter (DAC) 104, a switch 106, a laser array 107, a power combiner 110, and any other suitable transmitter components.

The TX DSP unit 102 may receive data 112 configured to be transmitted to the receiver 130. The data 112 may include a stream of digital data bits. The TX DSP unit 102 may process the data 112 to output a digital signal in a form suitable for transmission to the receiver 130. For example, the TX DSP unit 102 may apply a modulation technique to modulate a radio carrier with the data 112 and may output the modulated radio carrier to the DAC 104. Example modulation techniques may include, but are not limited to, a quadrature amplitude modulation (QAM) technique, a phase-shift keying (PSK) technique, a frequency-shift keying (FSK) technique, an amplitude-shift keying (ASK) technique, non-return-to-zero (NRZ) line coding, pulse-amplitude modulation (PAM), and any other suitable modulation techniques.

In some embodiments, the TX DSP unit 102 may include a discrete multi-tone (DMT) TX DSP unit. The digital signal outputted from the TX DSP unit 102 may include a DMT signal that includes a set of DMT subcarriers. The DMT subcarriers may include multiple harmonically-related radio subcarriers. For example, the TX DSP unit 102 may encode the data 112 on multiple DMT subcarriers and may output a DMT signal that includes the encoded DMT subcarriers. Each DMT subcarrier may be encoded using a QAM modulation technique. Example QAM modulation techniques may include, but are not limited to, QAM, 4-QAM, 8-QAM, 16-QAM, and any other suitable QAM techniques.

In some embodiments, data encoded in the DMT signal may be unequally allocated across frequency since different subchannels or subcarriers associated with different frequencies may have varied SNRs. For example, a first subchannel (e.g., a first subcarrier) with a higher SNR may be loaded with more bits per second than a second subchannel (e.g., a second subcarrier) with a lower SNR. As a result, data to transmit through the first subcarrier may be modulated with a first QAM technique that has a higher modulation order than a second QAM technique used in the second subcarrier. For example, the first QAM technique may include a 16-QAM technique while the second QAM technique may include an 8-QAM technique. However, if an SNR of a particular subcarrier is lower than a threshold, the particular subcarrier may not be used to transmit any data. The TX DSP unit 102 may load different numbers of bits to different subcarriers per symbol transmission. The TX DSP unit 102 may allocate a signal power among the different subcarriers. The signal power may be limited and may share among the subcarriers. For example, the TX DSP unit 102 may implement loading techniques to determine a number of bits to be loaded to each subcarrier and to determine a respective transmission power level distributed to each subcarrier. Example loading techniques may include, but are not limited to, a water-filling technique, a discrete-bit-allocation technique, and any other suitable loading techniques.

The DAC 104 may convert a digital signal (e.g., a DMT signal) outputted from the TX DSP unit 102 to an analog signal. The switch 106 may select a wavelength out of multiple wavelengths to transmit the analog signal. For example, the switch 106 may select an optical channel from multiple optical channels to transmit the analog signal, where the optical channel may be described by the selected wavelength and the multiple optical channels may be described by the multiple wavelengths. The switch 106 may connect the DAC 104 to a corresponding one of multiple laser diodes 108a-108d (hereinafter "laser diode 108" or "laser diodes 108") from the laser array 107, where the corresponding laser diode 108 may emit an optical carrier with the selected wavelength according to the input analog signal.

Each laser diode 108 may include a VCSEL or another suitable laser. In some embodiments, the laser array 107 may include multiple laser diodes 108, with each laser diode 108 configured to emit an optical carrier with a different wavelength according to a respective input signal. Wavelengths of optical carriers emitted from the laser diodes 108 may be in a wavelength range between 780 nanometers and 1000 nanometers. Each two adjacent wavelengths may be spaced with a distance between 15 nanometers and 60 nanometers. For example, the laser diode 108a may emit an optical carrier with a wavelength $\lambda_1$, the laser diode 108b may emit an optical carrier with a wavelength $\lambda_2$, the laser diode 108c may emit an optical carrier with a wavelength $\lambda_3$, and the laser diode 108d may emit an optical carrier with a wavelength $\lambda_1$, where 720 nanometers$\leq\lambda_i\leq$1000 nanometers (i=1, 2, 3, and 4), 15 nanometers$\leq\lambda_2-\lambda_1\leq$60 nanometers, 15 nanometers$\leq\lambda_3-\lambda_2\leq$60 nanometers, and 15 nanometers$\leq\lambda_4-\lambda_3\leq$60 nanometers.

The power combiner 110 may combine one or more inputs to generate a laser beam and may deliver the laser beam to the optical link 150 for transmission to the receiver 130. Since the switch 106 may be configured to select a single wavelength to transmit the analog signal outputted from the DAC 104, the power combiner 110 may have a single optical carrier input with the selected wavelength from a corresponding laser diode 108. The power combiner 110 may pass the optical carrier with the selected wavelength to the optical link 150. In some embodiments, a WDM multiplexer may replace the power combiner 110 and the optical carrier with the selected wavelength may propagate through the WDM multiplexer to the optical link 150.

The receiver 130 may include a photodiode 120, an amplifier 122, an analog-to-digital converter (ADC) 124, a receiver (RX) DSP unit 126, and any other suitable receiver components. In some embodiments, the receiver 130 may perform inverse operations of the transmitter 116.

The photodiode 120 may receive a laser beam from the optical link 150. The laser beam may include an optical carrier with the selected wavelength corrupted by noise, distortion, and/or loss during a propagation process through the optical link 150. The photodiode 120 may convert the laser beam into an analog signal. The amplifier 122 may include a transimpedance amplifier or other amplifier circuitry. The amplifier 122 may amplify the analog signal received from the photodiode 120. The ADC 124 may convert the amplified analog signal to a digital signal. The RX DSP unit 126 may process the digital signal to output the transmitted data 112. For example, if the TX DSP unit 102 encodes the DMT subcarriers with the transmitted data 112 and outputs a DMT signal with the encoded DMT subcarriers for transmission, the RX DSP unit 126 may receive a related DMT signal from the ADC 124 and may decode the received DMT signal to output the data 112.

Figure 2:
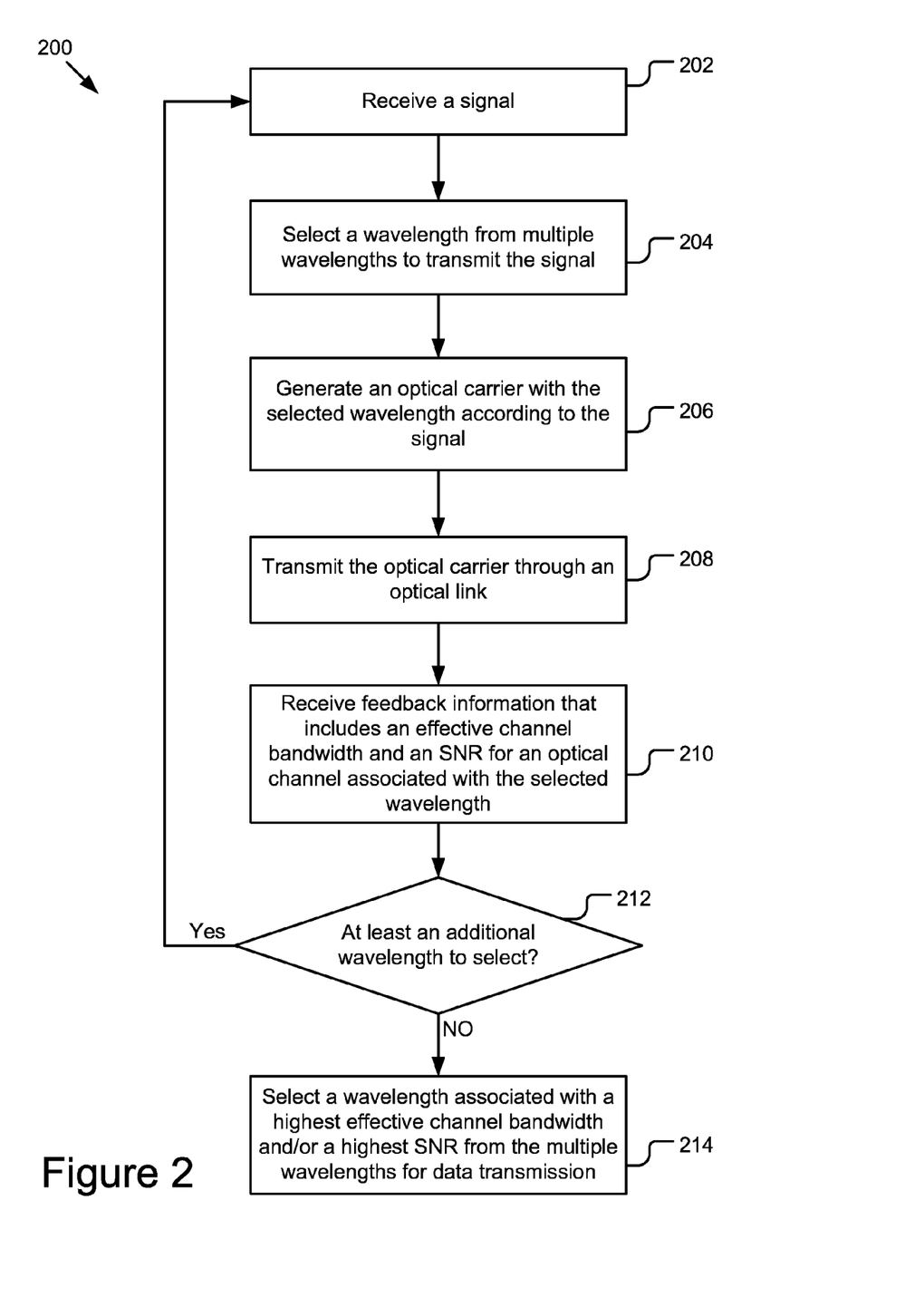
FIG. 2 shows an example flow diagram of a method of transmitting data using multiple wavelengths on an optical link.

FIG. 2 shows an example flow diagram of a method 200 of transmitting data using multiple wavelengths through an optical link, arranged in accordance with at least some embodiments described herein. The method 200 may be performed in whole or in part by a transmitter (e.g., the transmitter 116 of FIG. 1). Although illustrated as discrete blocks, various blocks may be divided into additional blocks, combined into fewer blocks, or eliminated, depending on the desired implementation.

The method 200 may begin at block 202 in which a signal may be received. For example, the switch 106 of FIG. 1 may receive an analog signal from the DAC 104 of FIG. 1. The analog signal may be converted from a digital signal that may be encoded with data to be transmitted to a receiver such as the receiver 130 of FIG. 1.

At block 204, a wavelength may be selected from multiple wavelengths to transmit the signal. For example, the switch 106 of FIG. 1 may select a wavelength from multiple wavelengths and may connect the DAC 104 of FIG. 1 to a corresponding one of the laser diodes 108 of FIG. 1 that may emit an optical carrier with the selected wavelength.

At block 206, the optical carrier that has the selected wavelength may be generated according to the signal. For example, a corresponding laser diode 108 of FIG. 1 associated with the selected wavelength may emit the optical carrier with the selected wavelength.

At block 208, the optical carrier may be transmitted to the receiver on an optical channel associated with the selected wavelength through an optical link such as the optical link 150 of FIG. 1.

The receiver may receive a laser beam through the optical link. The laser beam may include the optical carrier corrupted by noise, distortion, and/or propagation loss. The receiver may decode the signal as well as the transmitted data from the received laser beam. The receiver (or a RX DSP unit of the receiver) may measure a SNR of the optical channel associated with the selected wavelength and may estimate an effective channel bandwidth of the optical channel. The receiver may transmit the SNR and the effective channel bandwidth of the optical channel as feedback information to the transmitter.

For example, the signal may include a DMT signal. The receiver may measure SNRs of different subcarriers of the DMT signal after processing the received laser beam. The receiver may estimate an effective channel bandwidth of the optical channel based on the SNRs of the different subcarriers. An SNR of the optical channel may be described by the SNRs of the different subcarriers. The receiver may transmit the SNRs of different subcarriers and the effective channel bandwidth of the optical channel as feedback information to the transmitter.

At block 210, feedback information may be received at the transmitter. The feedback information may include the effective channel bandwidth and the SNR of the optical channel associated with the selected wavelength. Alternatively or additionally, the feedback information may include the SNRs of the different subcarriers.

At block 212, the method 200 may include determining whether there is at least an additional wavelength to select for data transmission. If there is at least one additional wavelength to select for data transmission ("Yes" at block 212), the method 200 may return to block 202. The method 200 may proceed to determine an effective channel bandwidth and an SNR of an optical channel associated with the at least one additional wavelength. Otherwise ("No" at block 212), the method 200 may move to block 214.

At block 214, a wavelength associated with a highest effective channel bandwidth and/or a highest SNR may be selected from the multiple wavelengths for data transmission. For example, an effective channel bandwidth and a SNR associated with each wavelength may be determined by performing operations similar to blocks 202, 204, 206, 208, and 210 for each of the wavelengths. Next, the switch 106 may select a wavelength associated with the highest effective channel bandwidth and/or the highest SNR to transmit data to the receiver for a maximal reach and/or an increased bit rate. This approach may increase the available MMF channel bandwidth for data transmission.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Some embodiments disclosed herein include an article of manufacture such as a non-transitory computer storage medium having instructions stored thereon that are executable by a computing device to perform or control performance of operations included in the method 200 of FIG. 2, such as the operations illustrated by blocks 202, 204, 206, 208, 210, 212, and/or 214 in FIG. 2, and/or variations thereof. The non-transitory computer storage medium may be included in or may be accessible to a computing device such as the computing device 500 of FIG. 5 or a DSP unit that includes a processor and a memory. In some embodiments, the non-transitory computer storage medium may be included in or may be accessible to the transmitter 116.

Figure 3:
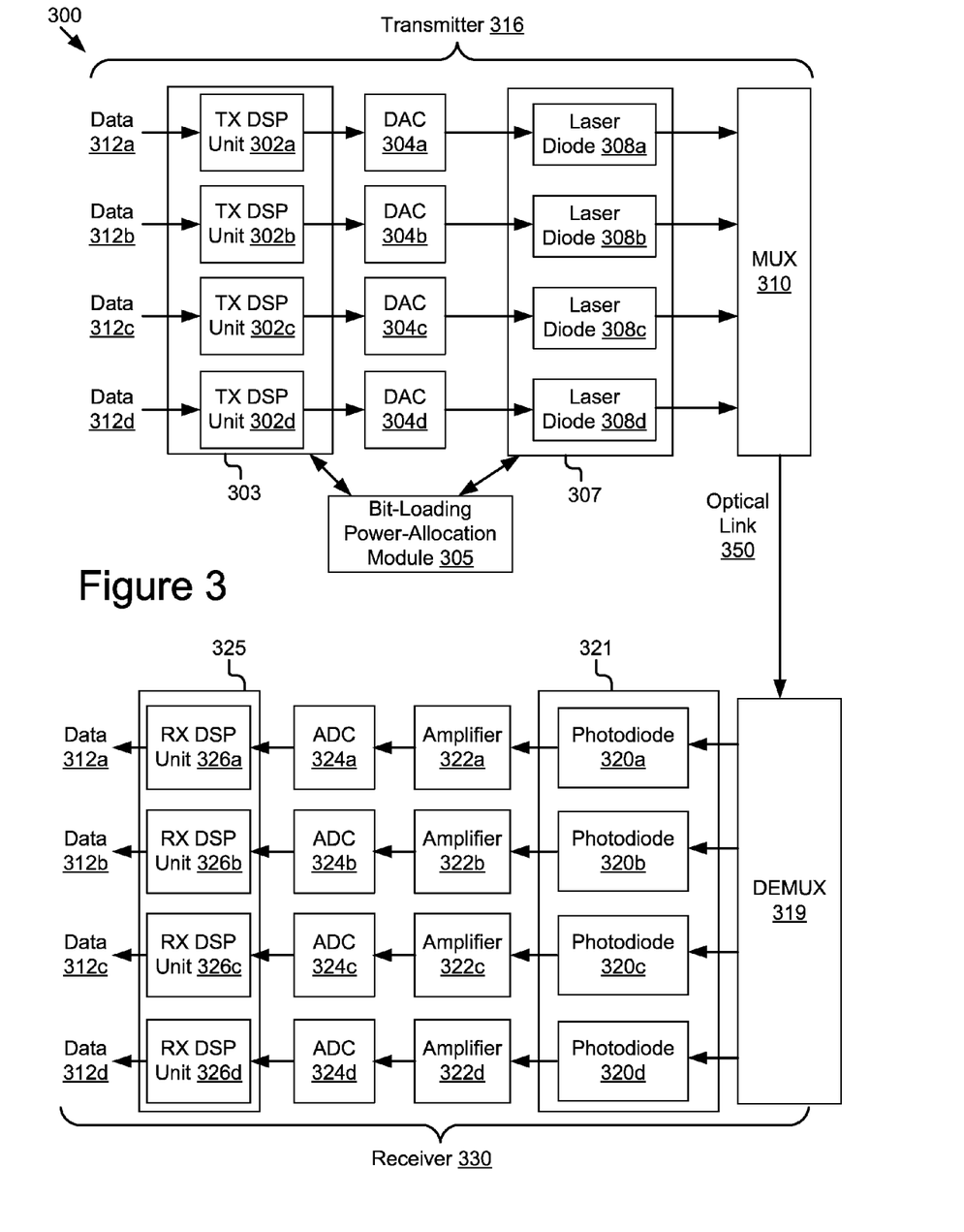
FIG. 3 is a block diagram of another example structure of a data communication system.

FIG. 3 is a block diagram of another example structure of a data communication system 300, arranged in accordance with at least some embodiments described herein. The example data communication system 300 illustrated in FIG. 3 includes a transmitter 316 and a receiver 330. The transmitter 316 may transmit data to the receiver 330 through an optical link 350. The optical link 350 may include one or more MMF fibers such as OM3 or any other suitable multi-mode fibers. The optical link 350 may be similar to the optical link 150 of FIG. 1. In some embodiments, the data communication system 300 may include a first transceiver and a second transceiver that may communicate with each other through the optical link 350. The first transceiver may include the transmitter 316 and a receiver that may be similar to the receiver 330. The second transceiver may include the receiver 330 and a transmitter that may be similar to the transmitter 316. In these and other embodiments, data communication through the optical link 350 may be bi-directional.

The transmitter 316 may include a TX DSP module 303 that includes one or more TX DSP units 302 (e.g., TX DSP units 302a, 302b, 302c, and 302d), one or more DACs 304 (e.g., DACs 304a, 304b, 304c, and 304d), a laser array 307 that includes one or more laser diodes 308 (e.g., laser diodes 308a, 308b, 308c, and 308d), a multiplexer (MUX) 310, a bit-loading and power-allocation module 305, and any other suitable transmitter components. In some embodiments, the bit-loading power-allocation module 305 may be integrated with the TX DSP module 303.

The TX DSP units 302, the DACs 304, and the laser diodes 308 may provide functionalities similar to those of the TX DSP unit 102, the DAC 104, and the laser diodes 108 of FIG. 1, respectively. The description will not be repeated here.

Each TX DSP unit 302 may receive a respective stream of data 312a-312d (e.g., a respective stream of digital data bits), hereinafter "stream of data 312" or "streams of data 312," and may process the respective stream of data 312 to output a respective digital signal in a form suitable for transmission to the receiver 330. For example, the TX DSP unit 302a may receive a stream of data 312a, apply a modulation technique to modulate a first radio carrier using the stream of data 312a, and output the first modulated radio carrier to the DAC 304a. Similarly, the TX DSP unit 302b may receive a stream of data 312b, apply a modulation technique to modulate a second radio carrier using the stream of data 312b, and output the second modulated radio carrier to the DAC 304b. The TX DSP unit 302c may receive a stream of data 312c, apply a modulation technique to modulate a third radio carrier using the stream of data 312c, and output the third modulated radio carrier to the DAC 304c. The TX DSP unit 302d may receive a stream of data 312d, apply a modulation technique to modulate a fourth radio carrier using the stream of data 312d, and output the fourth modulated radio carrier to the DAC 304d.

In some embodiments, each digital signal outputted from a corresponding TX DSP unit 302 may include a respective DMT signal. For example, each TX DSP unit 302 may encode the respective stream of data 312 on multiple DMT subcarriers and may output a respective DMT signal that includes the encoded DMT subcarriers.

In some embodiments, for a particular DMT signal to be transmitted on an optical channel associated with a particular wavelength, the bit-loading power-allocation module 305 may cooperate with a corresponding TX DSP unit 302 to load different subcarriers of the DMT signal with different numbers of bits per unit of time (e.g., per symbol time) and to allocate different power levels to the different subcarriers based on SNRs associated with the different subcarriers. The bit loading and power allocation may be performed using a water filling technique or another suitable technique. For example, for a DMT signal outputted to the DAC 304a, the TX DSP unit 302a may load different subcarriers of the DMT signal with different numbers of bits per unit of time and may allocate a total power of the DMT signal among the different subcarriers. Similarly, for a DMT signal outputted to the DAC 304b (or 304c, 304d), the TX DSP unit 302b (or 302c, 302d) may load different subcarriers with different numbers of bits per unit of time and may allocate a total power of the DMT signal among the different subcarriers.

Each DAC 304 may convert a digital signal (e.g., a DMT signal) outputted from a corresponding TX DSP unit 302 to an analog signal. A corresponding laser diode 308 may receive the analog signal and may emit an optical carrier with a particular wavelength according to the analog signal. In some embodiments, each laser diode 308 in the laser array 307 may be configured to emit an optical carrier with a different wavelength. For example, the laser diode 308a may emit an optical carrier with a wavelength $\lambda_1$ based on an analog signal from the DAC 304a. Similarly, the laser diode 308b may emit an optical carrier with a wavelength $\lambda_2$ based on an analog signal from the DAC 304b. The laser diode 308c may emit an optical carrier with a wavelength $\lambda_3$ based on an analog signal from the DAC 304c. The laser diode 308d may emit an optical carrier with a wavelength $\lambda_4$ based on an analog signal from the DAC 304d. Wavelengths of the optical carriers may be in a wavelength range between 780 nanometers and 1000 nanometers. Each two adjacent wavelengths may be spaced with a distance between 15 nanometers and 60 nanometers.

Alternatively, the laser diodes 308 may be configured to emit optical carriers at a common wavelength for transmission across a parallel multi-fiber optical link (in which case the MUX 310 may be omitted and the optical link 350 may include multiple parallel optical fibers). Alternatively still, the transmitter 316 may include only two laser diodes 308 configured to emit optical carriers at the same or different wavelengths, with one or more suitable optical devices to polarize the two optical carriers orthogonally to each other for transmission across a single-fiber optical link.

In some embodiments, the bit-loading power-allocation module 305 may cooperate with the laser array 307 to allocate an optical power among optical channels associated with different wavelengths (e.g., to allocate the optical power among the different optical carriers with different wavelengths). The allocation of the optical power may be performed using a water filling technique or another suitable technique based on effective channel bandwidths and/or SNRs associated with the optical channels. The optical power may be limited and may be shared among the different optical channels. For example, a first optical channel associated with a first wavelength may be allocated with a higher optical power level than a second optical channel associated with a second wavelength if the first optical channel has a higher SNR and/or a higher channel bandwidth than the second optical channel.

The MUX 310 may multiplex optical carriers outputted from the laser array 307 onto the single optical link 350 for transmission to the receiver 330. The MUX 310 may include a WDM multiplexer.

The receiver 330 may include a demultiplexer (DEMUX) 319, a photodiode array 321 that includes one or more photodiodes 320 (e.g., photodiodes 320a, 320b, 320c, and 320d), one or more amplifiers 322 (e.g., amplifiers 322a, 322b, 322c, and 322d), one or more ADCs 324 (e.g., ADCs 324a, 324b, 324c, and 324d), a RX DSP module 325 that includes one or more RX DSP units 326 (e.g., RX DSP units 326a, 326b, 326c, and 326d), and any other suitable receiver components. In some embodiments, the receiver 330 may perform inverse operations of the transmitter 316. The photodiodes 320, the amplifiers 322, the ADCs 324, and the RX DSP units 326 may provide functionalities similar to those of the photodiode 120, the amplifier 122, the ADC 124, and the RX DSP unit 126 of FIG. 1, respectively.

In some embodiments, the DEMUX 319 may include a WDM demultiplexer. The DEMUX 319 may receive a laser beam from the optical link 350. The laser beam may include multiple optical carriers with different wavelengths corrupted by noise, loss, and/or distortion during the propagation process through the optical link 350. The DEMUX 319 may split the laser beam into separate optical carriers according to the different wavelengths of the optical carriers and may output the separate optical carriers to respective photodiodes 320 in the photodiode array 321. For example, the DEMUX 319 may output an optical carrier with a wavelength $\lambda_1$ to the photodiode 320a, an optical carrier with a wavelength $\lambda_2$ to the photodiode 320b, an optical carrier with a wavelength $\lambda_3$ to the photodiode 320c, and an optical carrier with a wavelength $\lambda_4$ to the photodiode 320d.

The photodiodes 320 may convert the optical carriers received from the DEMUX 319 into analog signals, respectively. Each amplifier 322 may include a transimpedance amplifier or other amplifier circuitry. The amplifiers 322 may amplify the analog signals received from the photodiodes 320, respectively. The ADCs 324 may convert the amplified analog signals to digital signals, respectively. The RX DSP units 326 may process the digital signals to output streams of data 312, respectively.

In some embodiments, each RX DSP unit 326 may estimate an SNR (or, SNRs of subcarriers) and an effective channel bandwidth of a corresponding optical channel. For example, the RX DSP unit 326a may estimate an SNR and an effective channel bandwidth of an optical channel associated with the wavelength $\lambda_1$, the RX DSP unit 326b may estimate an SNR and an effective channel bandwidth of an optical channel associated with the wavelength $\lambda_2$, the RX DSP unit 326c may estimate an SNR and an effective channel bandwidth of an optical channel associated with the wavelength $\lambda_3$, and the RX DSP unit 326d may estimate an SNR and an effective channel bandwidth of an optical channel associated with the wavelength $\lambda_4$. The SNRs and effective channel bandwidths of the different optical channels may be sent back to the transmitter 316 as feedback information that may be used to allocate data bits and power to the different optical channels at the transmitter 316 as described herein.

Figure 4A:
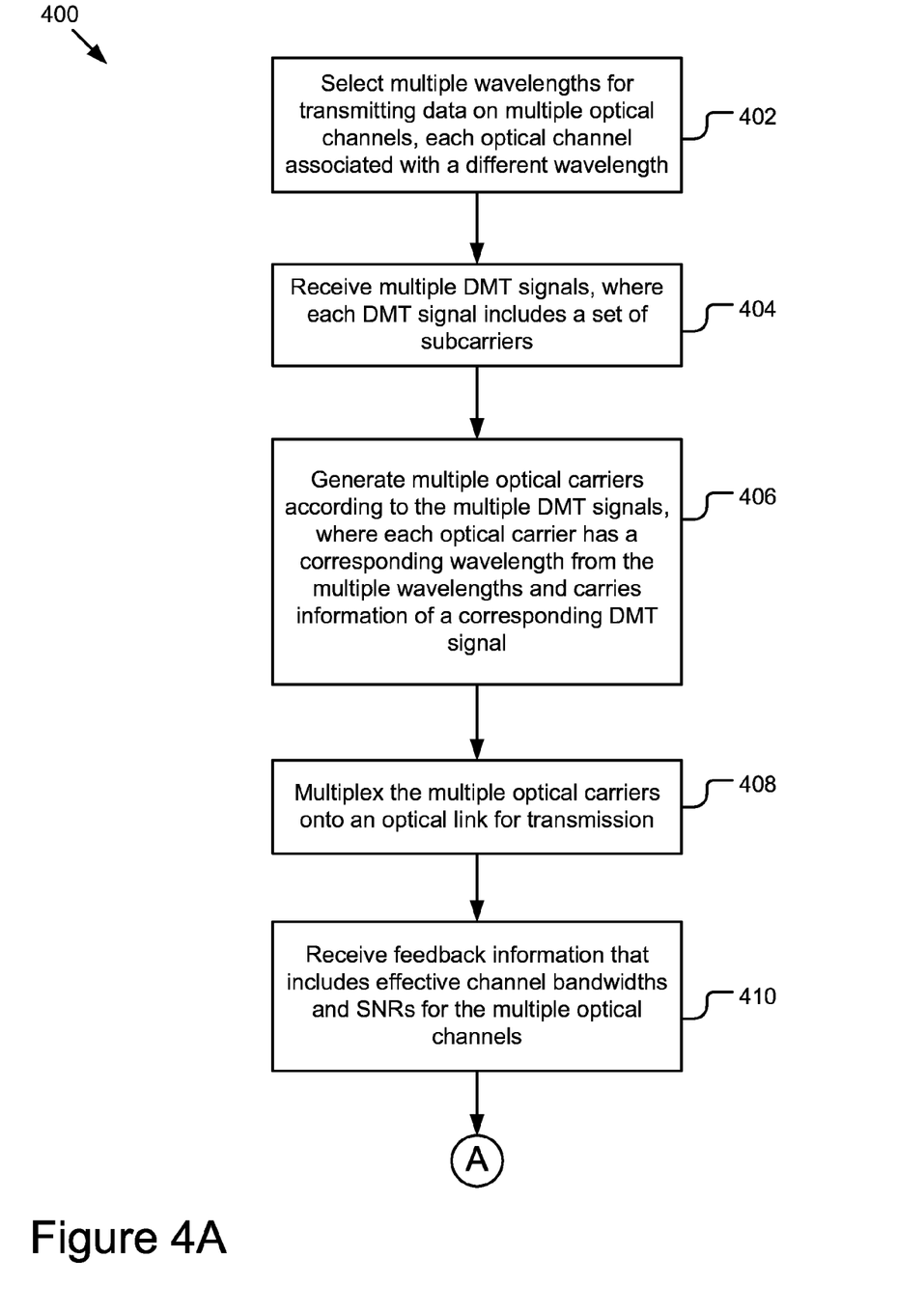
FIGS. 4A and 4B show another example flow diagram of a method of transmitting data using multiple wavelengths on an optical link.
Figure 4B:
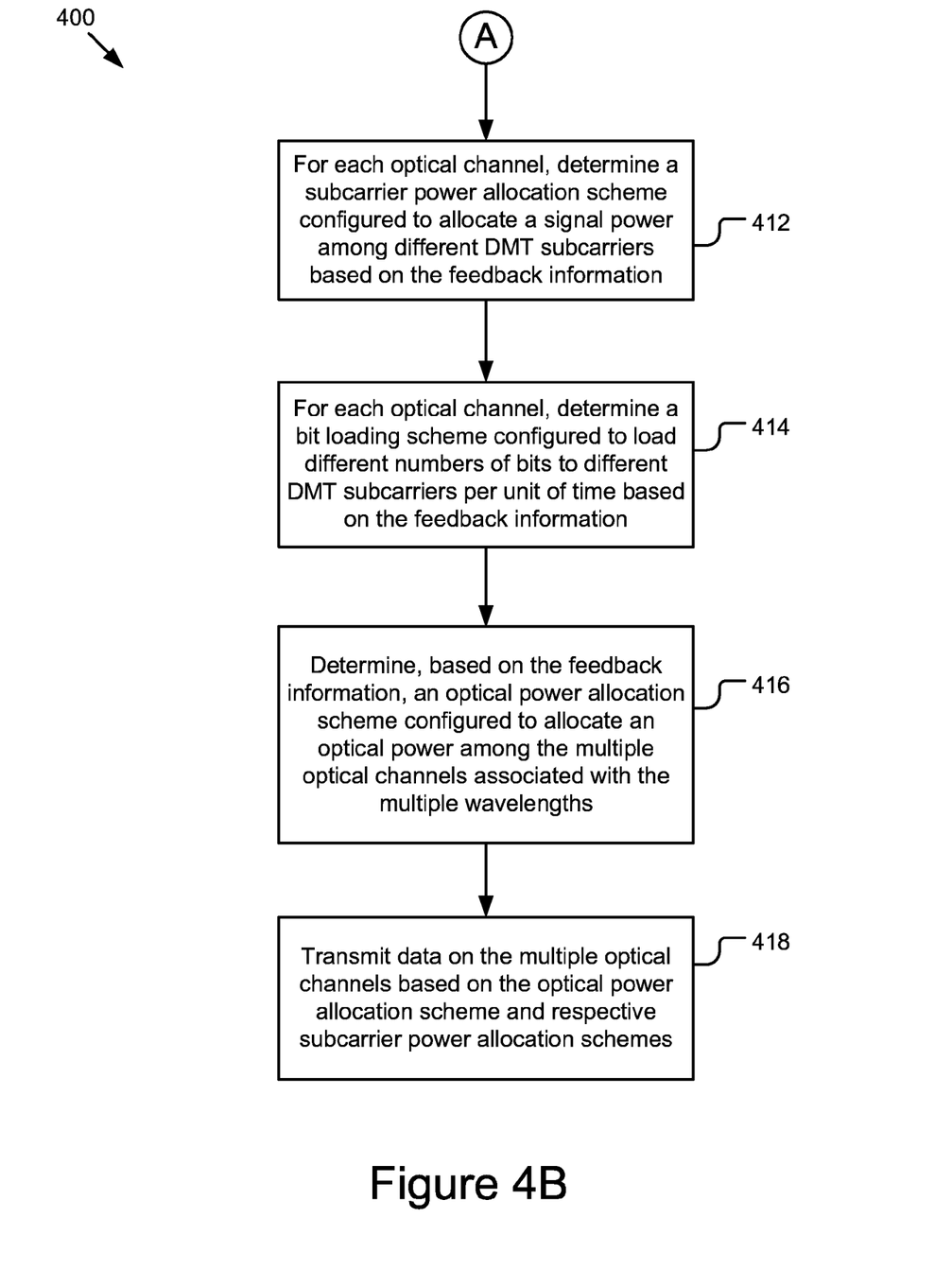

FIGS. 4A and 4B show an example flow diagram of a method 400 of transmitting data using multiple wavelengths through an optical link, arranged in accordance with at least some embodiments described herein. The method 400 may be performed in whole or in part by a transmitter (e.g., the transmitter 316 of FIG. 3). Although illustrated as discrete blocks, various blocks may be divided into additional blocks, combined into fewer blocks, or eliminated, depending on the desired implementation.

Referring to FIG. 4A, the method 400 may begin at block 402 in which multiple wavelengths may be selected for transmitting data on multiple optical channels associated with the multiple wavelengths. Each optical channel may be described by or associated with a different wavelength. The multiple wavelengths may be selected from a wavelength range between 780 nanometers and 1000 nanometers, with each two adjacent wavelengths spaced with a distance between 15 nanometers and 60 nanometers.

At block 404, multiple DMT signals may be received. Each DMT signal may include a set of subcarriers. For example, the TX DSP units 302 of FIG. 3 may generate respective DMT signals. The DACs 304 of FIG. 3 may convert the respective DMT signals to respective analog signals and may output the respective analog signals to the laser diodes 308 of FIG. 3.

At block 406, multiple optical carriers may be generated by multiple laser diodes (e.g., the laser diodes 308 of FIG. 3) according to the multiple DMT signals, respectively. Each optical carrier may have a corresponding wavelength from the multiple wavelengths and may carry information of a corresponding DMT signal from the multiple DMT signals. The multiple optical carriers may include optical carriers emitted from VCSELs or any other suitable lasers.

At block 408, the multiple optical carriers may be multiplexed by a multiplexer (e.g., the MUX 310 of FIG. 3) onto a single optical link for transmission to a receiver (e.g., the receiver 330 of FIG. 3). The optical link may include an OM3 link.

The receiver (e.g., the receiver 330 of FIG. 3) may receive a laser beam from the optical link. The laser beam may include the multiple optical carriers corrupted by noise, distortion, and/or loss during propagation through the optical link. The receiver may decode the DMT signals as well as the transmitted data bits carried by the DMT signals from the laser beam. The receiver may measure a SNR of each optical channel associated with a respective wavelength and may estimate an effective channel bandwidth of each optical channel. The receiver may transmit SNRs and effective channel bandwidths of the multiple optical channels as feedback information to the transmitter (e.g., the transmitter 316 of FIG. 3).

For example, for a particular optical channel associated with a particular wavelength configured to transmit a particular DMT signal, the receiver may measure SNRs of different subcarriers of the particular DMT signal and may estimate an effective channel bandwidth of the particular optical channel based on the SNRs of the different subcarriers. An SNR of the particular optical channel may be described by the SNRs of the different subcarriers. The receiver may transmit an SNR (or, SNRs of different subcarriers) and an effective channel bandwidth of each optical channel as feedback information to the transmitter.

At block 410, the feedback information may be received at the transmitter from the receiver. The feedback information may include effective channel bandwidths and SNRs associated with the multiple optical channels.

Referring to FIG. 4B, at block 412 a subcarrier power allocation scheme may be determined for each optical channel configured to transmit a corresponding DMT signal. The subcarrier power allocation scheme may be determined based on the feedback information. The subcarrier power allocation scheme may be configured to allocate a signal power of the DMT signal among different DMT subcarriers. For example, the feedback information may include different SNRs for different DMT subcarriers transmitted through a particular optical channel. The different DMT subcarriers may be allocated with different signal power levels based on their respective SNRs using a water filling technique or another suitable technique. Multiple subcarrier power allocation schemes may be created for the multiple optical channels, respectively.

At block 414, a bit loading scheme may be determined for each optical channel configured to transmit a corresponding DMT signal. The bit loading scheme may be determined based on the feedback information. The bit loading scheme may be configured to load different numbers of bits to different DMT subcarriers per unit of time. For example, the bit loading scheme may configure different bit rates for the different DMT subcarriers, respectively. In another example, the bit loading scheme may be configured to allocate different numbers of bits to the different DMT subcarriers per symbol time. In some embodiments, the feedback information may include different SNRs for different DMT subcarriers transmitted through a particular optical channel. The different DMT subcarriers may be allocated with different numbers of bits per unit of time based on their respective SNRs using a water filling technique or another suitable technique. Multiple bit loading schemes may be created for the multiple optical channels, respectively.

At block 416, an optical power allocation scheme may be determined based on the feedback information. The optical power allocation scheme may be configured to allocate an optical power among the multiple optical channels associated with the multiple wavelengths. The feedback information may be shared between the multiple optical channels and may be used to optimize the optical power allocation among the optical channels. The allocation of an optical power level to a particular optical channel may be determined based on the SNR and effective channel bandwidth of the particular optical channel and SNRs and effective channel bandwidths of the other optical channels. For example, the feedback information may include SNRs and effective channel bandwidths associated with the multiple optical channels. A first optical channel that has a higher SNR and/or a higher effective channel bandwidth than a second optical channel may be allocated with a higher optical power level than the second optical channel using a water filling technique or another suitable technique.

At block 418, data may be transmitted on the multiple optical channels based on the optical power allocation scheme and the respective subcarrier power allocation schemes associated with the multiple optical channels. For example, multiple signals (e.g., multiple DMT signals) each with a set of subcarriers may be generated to carry data to be transmitted to the receiver. A particular signal from the multiple signals may transmit on a particular optical channel from the multiple optical channels. Power levels of subcarriers of the particular signal may be allocated according to a subcarrier power allocation scheme associated with the particular optical channel. The subcarriers of the particular signal may also be loaded with different data bits per symbol time according to a bit loading scheme associated with the particular optical channel. Next, multiple optical carriers may be generated according to the multiple signals, respectively. For example, the multiple signals may be inputted to multiple laser diodes (e.g., VCSELs) that may emit multiple optical carriers, respectively. The multiple optical carriers may have different wavelengths and may transmit on the multiple optical channels, respectively. Each optical carrier may carry information of a corresponding signal from the multiple signals. The optical power may be allocated among the multiple optical carriers based on the optical power allocation scheme. The multiple optical carriers may be multiplexed onto the optical link for transmission to the receiver.

Some embodiments disclosed herein include an article of manufacture such as a non-transitory computer storage medium having instructions stored thereon that are executable by a computing device to perform or control performance of operations included in the method 400 of FIGS. 4A and 4B, such as the operations illustrated by blocks 402, 404, 406, 408, 410, 412, 414, 416, and/or 418 in FIGS. 4A and 4B, and/or variations thereof. The non-transitory computer storage medium may be included in or may be accessible to a computing device such as the computing device 500 of FIG. 5 or a DSP unit that includes a processor and a memory. In some embodiments, the non-transitory computer storage medium may be included in or may be accessible to the transmitter 316 of FIG. 3.

Figure 4C:
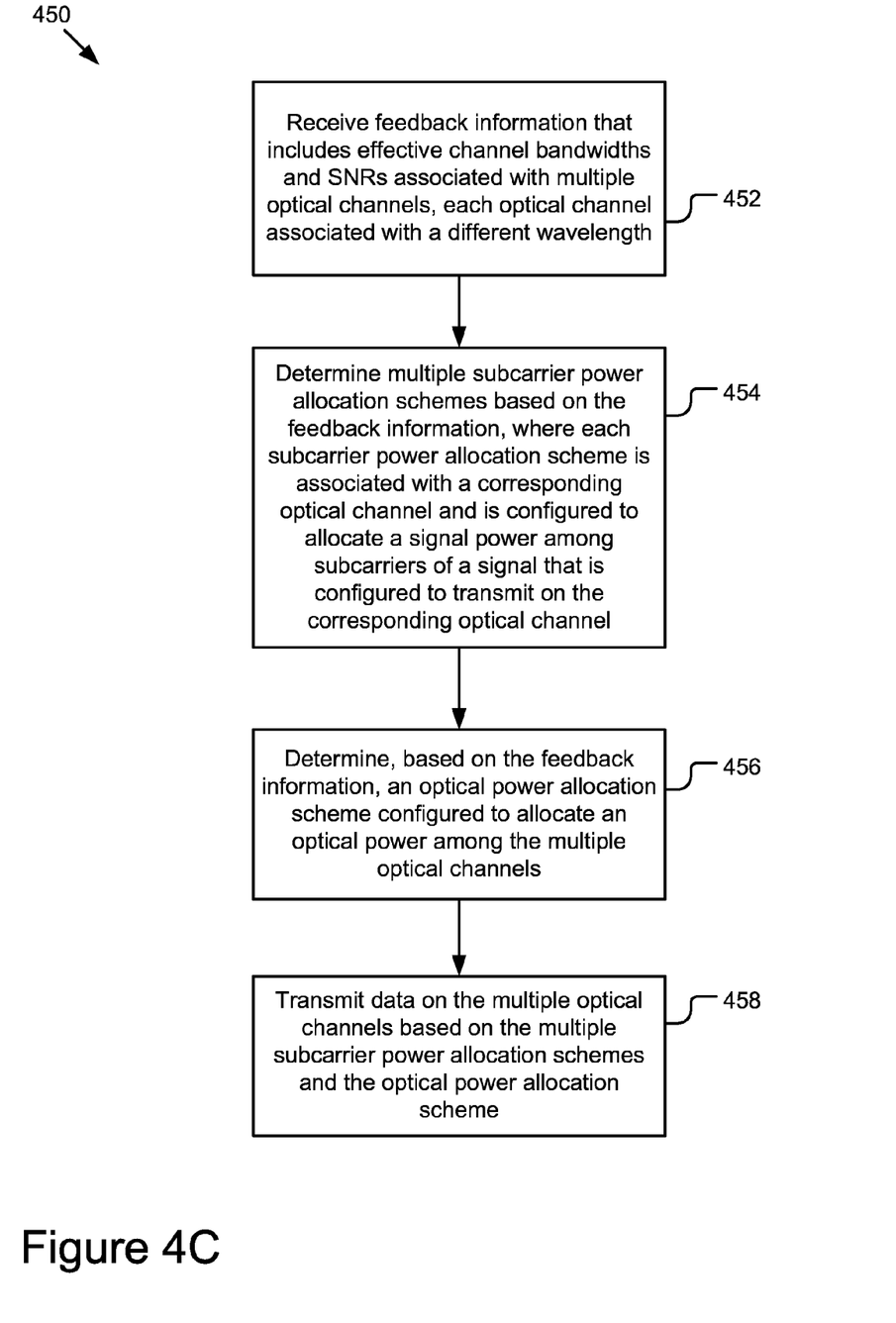
FIG. 4C shows yet another example flow diagram of a method of transmitting data using multiple wavelengths on an optical link.

FIG. 4C shows another example flow diagram of a method 450 of transmitting data using multiple wavelengths through an optical link, arranged in accordance with at least some embodiments described herein. The method 450 may be performed in whole or in part by a transmitter (e.g., the transmitter 316 of FIG. 3). Although illustrated as discrete blocks, various blocks may be divided into additional blocks, combined into fewer blocks, or eliminated, depending on the desired implementation.

The method 450 may begin at block 452 in which feedback information that includes effective channel bandwidths and SNRs associated with multiple optical channels may be received. Each optical channel may be associated with a different wavelength.

At block 454, multiple subcarrier power allocation schemes may be determined based on the feedback information. Each subcarrier power allocation scheme may be associated with a corresponding optical channel and may be configured to allocate a signal power among subcarriers of a signal configured to transmit on the corresponding optical channel.

At block 456, an optical power allocation scheme may be determined based on the feedback information. The optical power allocation scheme may be configured to allocate an optical power among the multiple optical channels.

At block 458, data may be transmitted on the multiple optical channels based on the multiple subcarrier power allocation schemes and the optical power allocation scheme.

Some embodiments disclosed herein include an article of manufacture such as a non-transitory computer storage medium having instructions stored thereon that are executable by a computing device to perform or control performance of operations included in the method 450 of FIG. 4C, such as the operations illustrated by blocks 452, 454, 456, and/or 458 in FIG. 4C, and/or variations thereof. The non-transitory computer storage medium may be included in or may be accessible to a computing device such as the computing device 500 of FIG. 5 or a DSP unit that includes a processor and a memory. In some embodiments, the non-transitory computer storage medium may be included in or may be accessible to the transmitter 316 of FIG. 3.

Figure 5:
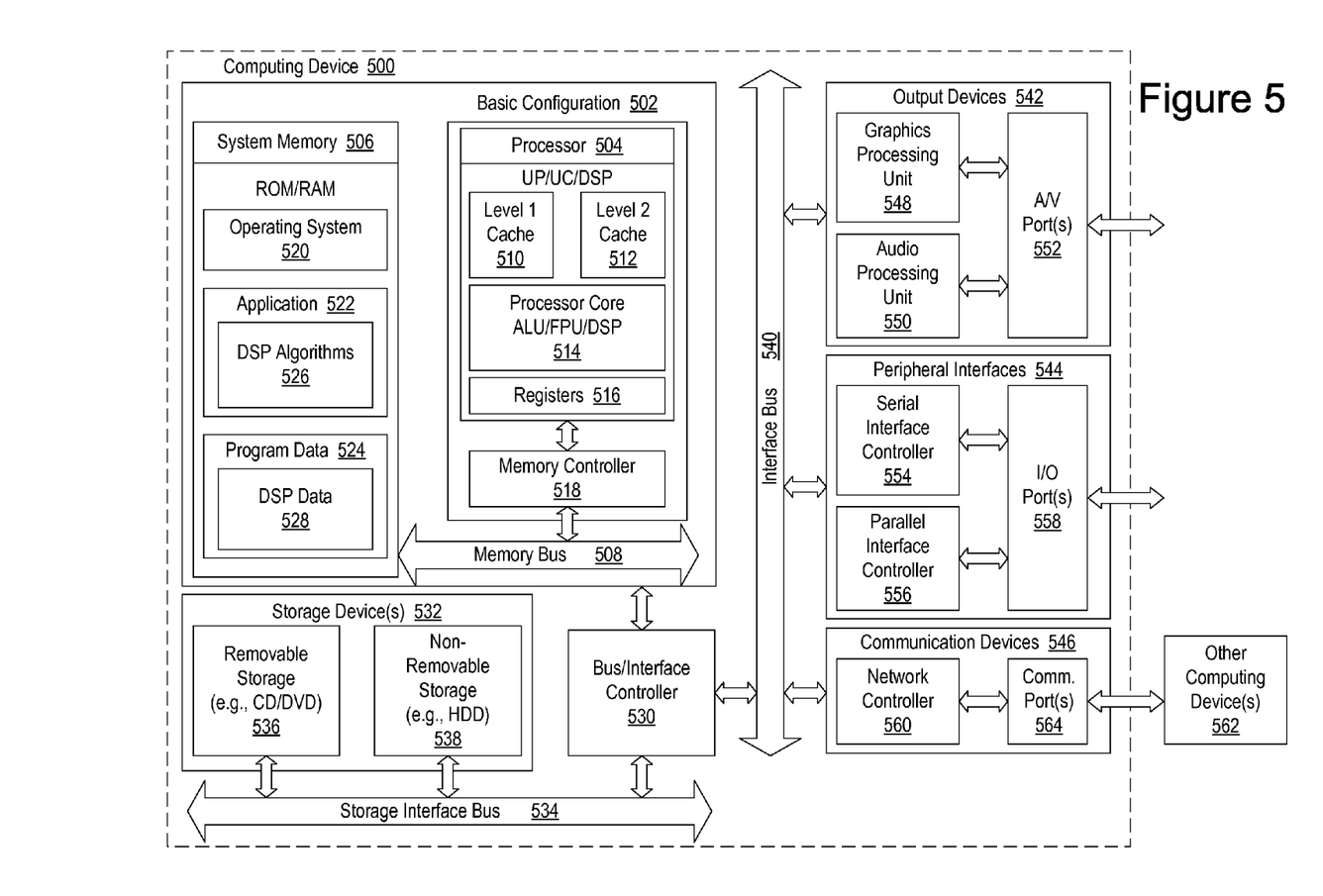
FIG. 5 is a block diagram that illustrates an example computing device that is arranged for implementing digital signal processing techniques in a data communication system.

FIG. 5 is a block diagram that illustrates an example computing device 500 that is arranged for implementing digital signal processing techniques in a data communication system, arranged in accordance with at least some embodiments described herein. In a very basic configuration 502, the computing device 500 may typically include one or more processors 504 and a system memory 506. A memory bus 508 may be used for communicating between the processor 504 and the system memory 506.

Depending on the desired configuration, the processor 504 may be of any type including, but not limited to, a CPU, a µP, a µC, a DSP, or any combination thereof. The processor 504 may include one or more levels of caching, such as a level one cache 510 and a level two cache 512, a processor core 514, and registers 516. The example processor core 514 may include an arithmetic logic unit (ALU), a floating point unit (FPU), a digital signal processor core (DSP core), or any combination thereof. An example memory controller 518 may also be used with the processor 504, or in some implementations the memory controller 518 may be an internal part of the processor 504.

Depending on the desired configuration, the system memory 506 may be of any type including, but not limited to, volatile memory (such as RAM), non-volatile memory (such as ROM, flash memory), or any combination thereof. The system memory 506 may include an operating system (OS) 520, one or more applications 522, and program data 524. The application 522 may include digital signal processing (DSP) algorithms 526, or other application that may be arranged to perform one or more of the functions as described herein including those described with respect to the methods 200, 400, and 450 of FIGS. 2 and 4A-4C. The program data 524 may include DSP data 528 that may be pulled into the application 522 for analysis. In some embodiments, the application 522 may be arranged to operate with the program data 524 on the OS 520 such that implementations of methods for transmitting data such as the methods 200, 400, and 450 of FIGS. 2 and 4A-4C, may be provided as described herein.

The computing device 500 may have additional features or functionality, and additional interfaces to facilitate communications between the basic configuration 502 and any required devices and interfaces. For example, a bus/interface controller 530 may be used to facilitate communications between the basic configuration 502 and one or more data storage devices 532 via a storage interface bus 534. The data storage devices 532 may be removable storage devices 536, non-removable storage devices 538, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer-readable instructions, data structures, program modules, or other data.

The system memory 506, removable storage devices 536, and non-removable storage devices 538 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by the computing device 500. Any such computer storage media may be part of the computing device 500.

The computing device 500 may also include an interface bus 540 for facilitating communication from various interface devices (e.g., output devices 542, peripheral interfaces 544, and communication devices 546) to the basic configuration 502 via the bus/interface controller 530. Example output devices 542 include a graphics processing unit 548 and an audio processing unit 550, which may be configured to communicate to various external devices such as a display or speakers via one or more A/V ports 552. Example peripheral interfaces 544 include a serial interface controller 554 or a parallel interface controller 556, which may be configured to communicate with external devices such as input devices (e.g., keyboard, mouse, pen, voice input device, touch input device) or other peripheral devices (e.g., printer, scanner) via one or more I/O ports 558. The example communication device 546 may include a network controller 560, which may be arranged to facilitate communications with one or more other computing devices 562 over a network communication link via one or more communication ports 564.

The network communication link may be one example of a communication media. Communication media may typically be embodied by computer-readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR), and other wireless media. The term computer-readable media as used herein may include both storage media and communication media.

The computing device 500 may be implemented as a portion of a small-form factor portable (or mobile) electronic device such as a cell phone, a personal data assistant (PDA), a personal media player device, a wireless web-watch device, a personal headset device, an application-specific device, or a hybrid device that includes any of the above functions. The computing device 500 may also be implemented as a personal computer including both laptop computer and non-laptop computer configurations.

The present disclosure is not to be limited in terms of the particular embodiments described herein, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that the present disclosure is not limited to particular methods, reagents, compounds, compositions, or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of transmitting data through an optical link, the method comprising:
    receiving feedback information that includes effective channel bandwidths, signal-to-noise ratios (SNRs) associated with multiple optical channels on the optical link, and individual SNRs associated with subcarriers on each optical channel;
    determining multiple subcarrier power allocation schemes based on the feedback information, wherein each subcarrier power allocation scheme is associated with a corresponding optical channel from the multiple optical channels and is configured to allocate a signal power among subcarriers configured to transmit on the corresponding optical channel;
    determining, based on the feedback information, an optical power allocation scheme configured to allocate an optical power among the multiple optical channels; and
    transmitting data on the multiple optical channels based on the multiple subcarrier power allocation schemes and the optical power allocation scheme.

2. The method of claim 1, wherein the optical link comprises a single optical fiber and transmitting data on the multiple optical channels comprises transmitting data on the multiple optical channels simultaneously on the single optical fiber.

3. The method of claim 1, wherein the optical link comprises multiple optical fibers, each associated with a different one of the multiple optical channels such that transmitting data on the multiple optical channels comprises transmitting data for each of the multiple optical channels simultaneously on a different corresponding one of the multiple optical fibers.

4. The method of claim 1, wherein the subcarriers configured to transmit on the corresponding optical channel include discrete multi-tone (DMT) subcarriers and form a DMT signal.

5. The method of claim 1, further comprising determining multiple bit loading schemes based on the feedback information, wherein each bit loading scheme is associated with a corresponding optical channel from the multiple optical channels and is configured to allocate bit rates for subcarriers configured to transmit on the corresponding optical channel.

6. The method of claim 1, wherein transmitting data on the multiple optical channels based on the multiple subcarrier power allocation schemes and the optical power allocation scheme comprises:

generating multiple signals, wherein each signal includes a respective set of subcarriers and a power of each signal is allocated among the respective set of subcarriers based on a corresponding subcarrier power allocation scheme from the multiple subcarrier power allocation schemes;

generating multiple optical carriers to transmit on the multiple optical channels according to the multiple signals, wherein each optical carrier carries information of a corresponding signal from the multiple signals;

allocating the optical power among the multiple optical carriers based on the optical power allocation scheme; and multiplexing the multiple optical carriers onto the optical link to transmit through the optical link.

7. The method of claim 6, wherein the multiple signals include multiple discrete multi-tone (DMT) signals.

8. The method of claim 6, wherein the multiple optical carriers include optical carriers emitted from vertical-cavity surface-emitting lasers.

9. The method of claim 1, wherein the multiple optical channels have different wavelengths which are in a wavelength range between 780 nanometers and 1000 nanometers.

10. The method of claim 9, wherein each two adjacent wavelengths from the multiple wavelengths are spaced with a distance between 15 nanometers and 60 nanometers.

11. The method of claim 1, wherein the feedback information is shared between the multiple optical channels to determine the multiple subcarrier power allocation schemes and the optical power allocation scheme.

12. The method of claim 1, wherein the optical power allocation scheme is determined based on a water-filling technique.

13. A non-transitory computer storage medium having computer instructions stored thereon that are executable by a computing device to perform operations comprising:

receiving feedback information that includes effective channel bandwidths, signal-to-noise ratios (SNRs) associated with multiple optical channels on an optical link, and individual SNRs associated with subcarriers on each optical channel;

determining multiple subcarrier power allocation schemes based on the feedback information, wherein each subcarrier power allocation scheme is associated with a corresponding optical channel from the multiple optical channels and is configured to allocate a signal power among subcarriers configured to transmit on the corresponding optical channel; and determining, based on the feedback information, an optical power allocation scheme configured to allocate an optical power among the multiple optical channels.

14. The non-transitory computer storage medium of claim 13, wherein the subcarriers configured to transmit on the corresponding optical channel include discrete multi-tone (DMT) subcarriers and form a DMT signal.

15. The non-transitory computer storage medium of claim 13, wherein the operations further comprise determining multiple bit loading schemes based on the feedback information, wherein each bit loading scheme is associated with a corresponding optical channel from the multiple optical channels and is configured to allocate bit rates for subcarriers configured to transmit on the corresponding optical channel.

16. The non-transitory computer storage medium of claim 13, wherein the multiple optical channels have different wavelengths which are in a wavelength range between 780 nanometers and 1000 nanometers.

17. The non-transitory computer storage medium of claim 16, wherein each two adjacent wavelengths from the multiple wavelengths are spaced with a distance between 15 nanometers and 60 nanometers.

18. The non-transitory computer storage medium of claim 13, wherein the feedback information is shared between the multiple optical channels to determine the multiple subcarrier power allocation schemes and the optical power allocation scheme.

19. The non-transitory computer storage medium of claim 13, wherein the optical power allocation scheme is determined based on a water-filling technique.

20. A transmitter configured to transmit data through an optical link, the transmitter comprising:

a bit-loading power-allocation module configured to:
receive feedback information that includes effective channel bandwidths, signal-to-noise ratios (SNRs) associated with multiple optical channels on the optical link, and individual SNRs associated with subcarriers on each optical channel;

determine multiple subcarrier power allocation schemes based on the feedback information, wherein each subcarrier power allocation scheme is associated with a corresponding optical channel from the multiple optical channels and is configured to allocate a signal power among subcarriers configured to transmit on the corresponding optical channel; and determine, based on the feedback information, an optical power allocation scheme configured to allocate an optical power among the multiple optical channels; and a digital signal processor (DSP) module communicatively coupled to the bit-loading power-allocation module, wherein the DSP module is configured to generate multiple discrete multi-tone (DMT) signals, each DMT signal includes a respective set of subcarriers, and a power of each DMT signal is allocated among the respective set of subcarriers based on a corresponding subcarrier power allocation scheme from the multiple subcarrier power allocation schemes;

digital-to-analog converters (DACs) communicatively coupled to the DSP module, wherein the DACs are configured to convert the multiple DMT signals to respective analog signals;

a laser array communicatively coupled to the DACs and the bit-loading power-allocation module, wherein the laser array is configured to generate multiple optical carriers to transmit on the multiple optical channels according to the respective analog signals, each optical carrier carries information of a corresponding DMT signal from the multiple DMT signals, and the laser array is configured to allocate the optical power among the multiple optical carriers based on the optical power allocation scheme; and a multiplexer communicatively coupled to the laser array, wherein the multiplexer is configured to multiplex the multiple optical carriers onto the optical link to transmit through the optical link.

21. The transmitter of claim 20, wherein the multiple optical carriers have different wavelengths which are in a wavelength range between 780 nanometers and 1000 nanometers.

22. The transmitter of claim 20, wherein the laser array includes multiple vertical-cavity surface-emitting lasers.

* * * * *